United States Patent Office 2,989,460
Patented June 20, 1961

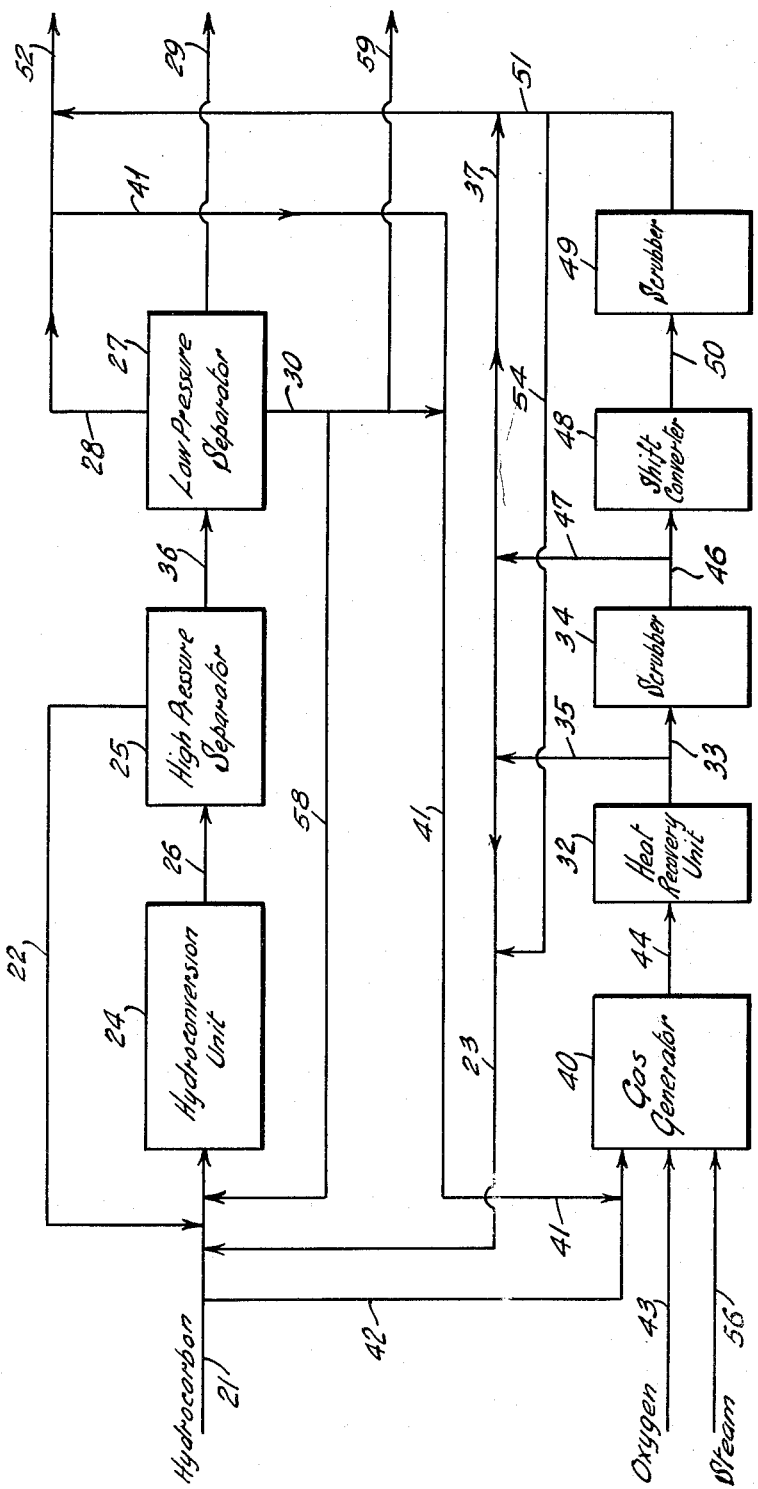

2,989,460
TREATMENT OF HYDROCARBONS
Du Bois Eastman, Whittier, and Warren G. Schlinger, Pasadena, Calif., assignors to Texaco Inc., a corporation of Delaware
Filed June 5, 1958, Ser. No. 740,137
2 Claims. (Cl. 208—107)

This invention relates to the hydroconversion of hydrocarbons. More particularly, it relates to the apolymeric hydroconversion of liquid hydrocarbons by contacting the liquid hydrocarbon with a gas containing hydrogen under conditions of turbulent flow and at temperatures and pressures to convert at least a portion of the liquid hydrocarbon into more valuable products.

In the hydroconversion processes of the prior art the yields of desirable lighter products have been unsatisfactory whereas yields of undesirable products such as high polymers and coke have been uneconomically high. The destructive or splitting type of conversion can be likened to viscosity breaking, a mild thermal process generally carried out at temperatures of about 935° F. and pressures of about 50 p.s.i.g. Deeper conversion by thermal cracking results in the formation of large amounts of high polymers and coke, particularly in the case of heavy petroleum oils which are liquid or a portion thereof is liquid at reaction conditions. In these latter instances hydrogen has been added to the thermal cracking process in an attempt to suppress the formation of high polmers and coke. However, even with the presence of hydrogen, prior art hydroconversion processes have still produced large amounts of high polymers and coke.

In the conventional hydroconversion of petroleum oils as practiced in Germany, the main or splitting reaction is carried out in large reactors which contain a heavy viscous phase through which relatively pure hydrogen is bubbled. The poor agitation in this system limited the rate at which the reaction could proceed and although the reaction was carried out under mild conditions, it was accompanied by the production of large amounts of high polymers and coke.

Apparently the reason for the production of the undesirable high polymers and coke, even when hydrogen is added, is that the hydrogen does not reach the site of the reaction in sufficient amounts to react with the active fragments produced by the cracking and as a result the active fragments inter-react to form polymers. When deeper conversion, as by thermal cracking is attempted at higher temperatures, it has been the practice in prior hydroconversion processes to increase the hydrogen concentration in the reaction zone. However, the increased hydrogen concentration has not rendered prior hydroconversion processes satisfactory because, as the temperature is increased, the rate of cracking increases more rapidly than does the rate of solution or diffusion of the hydrogen into the hydrocarbon and consequently even at higher hydrogen concentrations, the cracking reaction proceeds more rapidly than the hydrogen can dissolve or diffuse to the reaction site to react with the active fragments of cracking. As a result, although the overall concentration of the hydrogen in the reaction zone may be high there are many areas in the reaction zone where there is a local deficiency of hydrogen either because it has never reached that particular area or because it has been consumed but not replaced, and consequently the formation of polymers is not prevented in the hydroconversion processes of the prior art.

One method of effecting the apolymeric hydroconversion of a liquid hydrocarbon is to subject the hydrocarbon in intimate mixture with a gas containing hydrogen to conditions of highly turbulent flow at elevated temperatures and pressures. Such conditions may be obtained by flowing the reactants at high velocities as a confined stream through a coil or tubular conduit.

The apolymeric hydroconversion is effected at temperatures between 800 and 1500° F. preferably between about 900 and 1100° F. Superatmospheric pressures ranging from 500 to 20,000 p.s.i.g. and higher may be employed. Satisfactory results have been obtained using pressures of 1000 or 10,000 p.s.i.g. Residence times of from 5 seconds to 2 hours or longer may be used. Preferably the residence time ranges from about 20 to about 200 seconds. Gas rates of at least 1000 cubic feet per barrel of feed may be employed although rates of 2,000 to 100,000 cubic feet per barrel of feed are preferred. It is desirable for the gas to have a high hydrogen concentration, but hydrogen concentrations as low as 25 volume percent may be employed.

In our copending application Serial No. 577,027 filed April 9, 1956, now abandoned, there is described a method for the conversion of hydrocarbon oils by contacting the oil with hydrogen under conditions of turbulent flow.

In the described method, it is disclosed that oil feed rate, hydrogen recycle rate, reaction coil diameter, and operating conditions of temperature and pressure all tend to affect velocity of flow and turbulence. It was found convenient to express turbulence in terms of the ratio of the average apparent viscosity of the flowing stream, $\bar{\epsilon}_m$, to the molecular or kinematic viscosity $\nu$, vis, $$\frac{\bar{\epsilon}_m}{\nu}$$

and to refer to this ratio $$\frac{\bar{\epsilon}_m}{\nu}$$

as turbulence level. The apparent viscosity of the flowing stream $\epsilon_m$, equals the sum of the eddy viscosity, $\epsilon_m$, and the kinematic viscosity $\nu$ which may be shown by the expression $\epsilon_m = \epsilon_m + \nu$. Under conditions of turbulence, $\epsilon_m$ has a finite value and it is apparent that if the magnitude of the apparent viscosity exceeds the kinematic viscosity at the point in question, the ratio of $$\frac{\epsilon_m}{\nu}$$

exceeds unity. For a given turbulent system, it follows that the average value of the ratio, as expressed by $$\frac{\bar{\epsilon}_m}{\nu}$$

exceeds unity. The average apparent viscosity, $\bar{\epsilon}_m$ as employed herein is defined by the equation $$\bar{\epsilon}_m = \frac{1}{r_0} \int_0^{r_0} \epsilon_m dr$$

where $r_0$ is the radius of the conduit. By substitution and integration, employing the parameters described by Corcoran et al., Industrial and Engineering Chemistry, volume 44, page 410 (1952), this expression $$\bar{\epsilon}_m = \frac{1}{r_0} \int_0^{r_0} \epsilon_m dr$$

may be rewritten $$\bar{\epsilon}_m = \frac{r_0}{15} \sqrt{\frac{r_0 g}{2\sigma} \cdot \frac{dp}{dx}}$$

The latter equation is in terms which may be readily determined for a given system. In the foregoing, $d$ represents differential; $g$ represents acceleration of gravity, feet per second, per second; $p$ represents pressure, pounds per square foot; $r_0$ represents radius of conduit in feet; $x$ represents distance, feet; $\epsilon_m$ represents eddy viscosity, square feet per second; $\epsilon_m$ represents apparent viscosity, square feet per second; $\overline{\epsilon_m}$ represents average apparent viscosity, square feet per second; $\nu$ represents kinematic viscosity, square feet per second; and $\sigma$ represents specific weight, pounds per cubic foot. Turbulence levels of at least 25 may be employed but turbulence levels of 50 to 1000 are preferable.

In the above described process, the hydrocarbon feed is intimately mixed with the hydrogenating gas and the intimate mixture of hydrogen and hydrocarbon enables the hydrogen to reach quickly the active centers formed by cracking. By reducing the distance the hydrogen must dissolve or diffuse into the hydrocarbon, the hydrogenation of these active centers is effected smoothly and the formation of polymers is suppressed. When lighter oils are used as the feed stock, the oil may be in the vapor state under reaction conditions. When the feed stock is a heavy oil in some cases it or a portion thereof remains liquid under reaction conditions and consequently in this latter instance two phases are present in the reaction zone.

When two phases flow through the same conduit, it is possible to have several types of flow. These various types are stratified flow, wave flow, plug flow, slug flow, annular flow, bubble flow or froth flow and dispersed or spray flow and are described by Baker in the Oil and Gas Journal, July 26, 1954, page 185, et seq. In the present specification and appended claims the term "intimate mixture" is intended to exclude two-phase flows of the stratified, wave, plug, slug, and annular type.

According to the process of the present invention a liquid hydrocarbon is subjected to a polymeric hydroconversion, an upgraded liquid hydrocarbon product is recovered from the reaction product and at least a portion of the balance of the reaction product is subjected to partial combustion to produce hydrogen which is used for the apolymeric hydroconversion of additional liquid hydrocarbon.

Any liquid hydrocarbon such as vacuum residuum, kerosene, straight run gas oil, thermally cracked gas oil, fluid catalytically cracked cycle gas oil, whole crude, shale oil, tar sand oil, straight run gasoline and the like, or mixtures thereof may be converted to an upgraded liquid product by the process of the present invention.

When the feed is a straight run gasoline the reaction product is a mixture of light hydrocarbon gases and a motor fuel of improved octane number. The light hydrocarbon gases are then subjected to partial combustion to produce hydrogen for the apolymeric hydroconversion of additional straight run gasoline feed.

In like manner, when the feed is a heavy viscous oil which is to be upgraded to a lighter oil which is pumpable at normal temperatures, the light hydrocarbon gases recovered from the reaction product are subjected to partial combustion to produce hydrogen for the apolymeric hydroconversion of additional heavy viscous oil feed.

When the feed which is to be upgraded is a middle distillate or any fraction having a boiling range extending beyond that of motor fuel, the reaction product is composed of light hydrocarbon gases and a liquid product which can be separated into a motor fuel fraction and a fraction containing unconverted feed. If it is desired to produce principally motor fuel, the light hydrocarbon gases are subjected to partial combustion to produce hydrogen for the apolymeric hydroconversion and the unconverted feed may be recycled to the hydroconversion zone. However, if the desired products are motor fuel and heating gas, the unconverted portion of the feed is subjected to partial combustion to produce hydrogen. In some instances, it may be desirable to recover a motor fuel fraction from the reaction product and to subject both the light hydrocarbon gases and unconverted liquid hydrocarbon to partial combustion for the production of hydrogen.

Hydrogen for the apolymeric hydroconversion may be produced by the partial combustion of a portion of the reaction product with a gas containing free oxygen. When the feed to the gas generator is composed of light hydrocarbon gases ordinarily no steam is added. However, when the feed to the gas generator is composed of liquid hydrocarbons, the partial combustion is generally effected in the presence of steam. Sufficient oxygen is introduced into the gas generator with the feed to maintain autogenously within the generator a temperature between about 2200° F. and about 3200° F. This is done by introducing oxygen into the generator at the rate of from about 1.6 to 2.0 mols of free oxygen per million B.t.u. gross heating value of the feed to the gas generator.

When it is desired to convert, for example, a middle distillate into a heating gas and a motor fuel, that portion of the reaction product boiling above about 400° F. is subjected to partial combustion to produce the hydrogen necessary for the apolymeric hydroconversion of additional feed. If any metals are present in the middle distillate feed of the hydroconversion unit, these metals are concentrated in the heavy portion of the reaction product and thus are present in the feed to the gas generator. Since mineral ash-forming constituents are detrimental to the life of the refractory lining of the gas generator, the partial combustion of the liquid portion containing mineral ash-forming constituents is effected under controlled conditions of conversion.

The liquid portion is introduced into the reaction zone of the gas generator together with sufficient free oxygen to react exothermically with the feed to autogenously maintain a temperature in the range of about 2200° F. to about 3200° F. and to convert not less than about 90 percent and not more than 99.5 percent of the carbon contained in the feed to carbon oxides. The extent of conversion of the carbon may be varied within this range depending upon the amounts of heavy metals contained in the feed. The quantity of unconverted carbon should be at least 50 times and preferably 100 times the combined weights of the nickel and vanadium contained in the feed on the basis of the weight of the metal content of the metal-containing constituents present in the feed. The unconverted carbon from the hydrocarbon is liberated as free carbon. Under these conditions of limited carbon conversion, the ash-forming constituents of the feed, particularly the ash resulting from the heavy metal constituents, are associated with the carbon and the composite is liberated as carbonaceous solid in particle form. The carbonaceous solid particles containing the heavy metals are substantially harmless to the refractory lining of the gas generator.

More specifically, the liquid feed containing mineral ash-forming constituents including nickel and vanadium is admixed with steam and fed into a compact, unpacked reaction zone. The reaction zone is free from packing and catalyst and has an internal surface area of not more than 1.5 times the surface of a sphere equal in volume to the volume of the reaction zone. An oxygen-rich gas containing about 95 percent oxygen by volume is introduced into the reaction zone where it is mixed with the feed and steam. The generator may be operated at atmospheric or superatmospheric pressure. Preferably the generator is operated at a pressure within the range of from about 100 to about 600 pounds per square inch gauge. The temperature within the gas generator is autogenously maintained preferably within the range of 2500 to 2900° F.

The quantity of free oxygen supplied to the gas generator is limited so that the conversion of carbon to carbon oxides is limited to 90 to 99.5 percent of the carbon content of the oil fed to the gas generator. From about 1.8 to about 1.9 mols of free oxygen are supplied to the gas generator for each million B.t.u.'s. gross heating value of the feed to the gas generator.

The amount of unconverted carbon released as a carbonaceous solid in the generator should be at least 50 times by weight the combined weights of the metals including nickel and vanadium contained in the feed, based on the weight of the free metal content of the metal-containing compounds in the feed. Free carbon released in the gas generator is entrained in the gaseous products of reaction. Ash from the fuel, particularly the heavy metal constituents, is substantially completely retained in the carbonaceous residue.

The hot gases leaving the gas generator are generally at a temperature in excess of 2200° F. To take advantage of the sensible heat of the gases, it is desirable to subject them to heat exchange before, in the case of gases containing entrained carbon, the scrubbing operation. The cooling of the gases may be effected either by indirect or direct heat exchange. In the former case, the hot gases may be passed in indirect heat exchange with water or low pressure steam. The gases may also be passed in indirect heat exchange with either the hydrocarbon feed or the hydrogen-containing gas feed to the hydroconversion unit to preheat these reactants. Where the synthesis gas is to be used per se as the hydrogenating gas it may be subjected to direct heat exchange either with the recycle gas or with the hydrocarbon feed. When preliminary cooling of the hot gases from the gas generator has been effected by indirect heat exchange, the gases may then be scrubbed to remove any entrained carbon particles.

To produce a hydrogen-rich gas, the gaseous products from the partial combustion are cooled to a temperature of about 230–240° F. and are mixed with steam to provide a 4 or 5 to 1 water to CO ratio. The mixture is passed over an iron oxide catalyst in a reactor containing three intercooled beds. The mixture is introduced into the reactor at a temperature of about 700° F. In the first bed the temperature rises to about 850° F. The gases are then cooled to a temperature of about 720° F. prior to passage through a second bed wherein a temperature rise of about 30° F. is effected. The gases are then cooled to a temperature of about 680 to 700° F. before introduction into the third bed where very little temperature rise occurs. The gases are then cooled to 100° F. to allow the water to separate out and are then passed through an amine scrubber in which the $CO_2$ is absorbed. The scrubbed gas has a hydrogen content of about 95 volume percent. A portion, or all of this gas if necessary, is then recycled to the hydrogenation step. The balance, if any, may be combined with the gaseous product of the hydrogenation step.

The invention may be more easily understood by reference to the accompanying drawing which represents diagrammatically a flow scheme for the practice of the invention.

Liquid hydrocarbon is introduced into the system through line 21 and together with recycle gas from line 22 and makeup hydrogen from line 23 is passed into hydroconversion unit 24 where it is subjected to apolymeric hydroconversion. The effluent from hydroconversion unit 24 is transferred through line 26 to high pressure separator 25 where recycle gas is removed and returned to hydroconversion unit 24 through lines 22 and 21. The hydrocarbon material in the effluent is removed from high pressure separator 25 through line 36 to low pressure separator 27 where it is separated into a light hydrocarbon gas fraction withdrawn through lines 28 and 52, a motor fuel fraction withdrawn through line 29 and a fraction boiling above about 400° F., removed through line 30. The light hydrocarbon gases may be sent to product gas storage or may be sent to gas generator 40 through lines 41 and 42. In gas generator 40 the light hydrocarbon gases are subjected to partial combustion with an oxygen-containing gas introduced through line 43, and the hot reaction products are withdrawn from gas generator 40 through line 44 and cooled in heat recovery unit 32. The cooled gas which comprises a mixture of carbon monoxide and hydrogen may be sent directly to hydroconversion zone through lines 33, 35, 23 and 21. When the effluent gases from gas generator 40 contain free carbon, it is preferable to subject the gas to heat exchange in heat recovery unit 32 and then transfer the gases through line 33 to scrubber 34 where the carbon is removed. The scrubbed gases may then be sent to hydroconversion unit 24 through lines 46, 47, 23 and 21. Excess gas may be withdrawn from the system through lines 47, 37, 51 and 52.

When it is desired to conduct the apolymeric hydroconversion in the presence of a hydrogen rich gas, the gaseous effluent from heat recovery unit 32 may be sent to shift converter 48 through line 33, scrubber 34 and line 46. In shift converter 48, the effluent is converted to a gas rich in hydrogen. The hydrogen rich gas is introduced to scrubber 49 through line 50 and the scrubbed gas may be sent to hydroconversion zone 24 through lines 51, 54, 23 and 21. Excess hydrogen rich gas may be withdrawn from the system through lines 51, and 52.

If desired, all of the light hydrocarbon gases produced by the apolymeric hydroconversion may be removed from the system through lines 28 and 52 and the feed to the gas generator 40 may be composed of the fraction boiling above about 400° F. withdrawn from low pressure separator 27 through line 30 and introduced into gas generator 40 through lines 41 and 42. In this case it is generally desirable to add steam through line 56 in an amount between about 100 and 200 lbs. of steam per bbl. of feed.

When the feed to the hydroconversion unit 24 is a fraction having a wide distillation range, it may be desirable to send the light hydrocarbon gases withdrawn from low pressure separator 27 through lines 28, 52, 41 and 42 to gas generator 40 where the light hydrocarbon gases are subjected to partial combustion, withdraw a motor fuel fraction from low pressure separator 27 through line 29 and to recycle the fraction boiling above about 400° F. to hydroconversion unit 24 through lines 30, 58 and 21.

When it is desired to convert a heavy viscous oil to a liquid which is pumpable at ordinary temperatures, the light hydrocarbon gases removed from low pressure separator 27 are sent to gas generator 40 through lines 28, 52, 41 and 42 and the total liquid stream is withdrawn from low pressure separator 27 through lines 30 and 59. During start up and in some instances where the undesired products are unable to supply the hydrogen requirements for the apolymeric hydroconversion, a portion of the liquid hydrocarbon starting material may be sent to gas generator 40 through lines 21 and 42.

Various other modifications not specifically set forth above will be obvious to those skilled in the art.

The following examples are given for illustrative purposes only.

*Example I*

This example illustrates the conversion of a reduced crude to a motor fuel of high octane number.

A reduced Venezuelan crude having the following characteristics

| | |
|---|---|
| Gravity, ° API | 18.7 |
| Viscosity SF at 122 | 78 |
| Carbon residue, percent | 6.9 |
| Sulfur, weight, percent | 2.3 | is introduced into a tubular reactor under the following conditions

| | |
|---|---|
| Average temperature ° F | 939 |
| Average pressure p.s.i.g | 5693 |
| Turbulence level | 110 |

Gas rates:
  Makeup hydrogen _____ s.c.f./bbl__ 7800
  Product gas _____ s.c.f./bbl__ 5650
  Recycle gas _____ s.c.f./bbl__ 19,600
Hydrogen concentration:
  Makeup hydrogen _____ percent___ 94.51
  Product gas _____ do____ 82.74
  Recycle gas _____ do____ 89.21

The reaction product is separated into a normally gaseous fraction, a liquid fraction boiling up to 400° F. and a fraction boiling about 400° F. The motor fuel fraction, that is the fraction boiling up to 400° F. has ASTM research octane numbers of 77.2 clear and 91.7 when containing 3 cc. TEL per gallon and is obtained in a yield of 46.68 volume percent basis feed.

The hydrogen for the apolymeric hydroconversion is produced by subjecting to partial combustion the fraction boiling above 400° F.

The fraction boiling above 400° F. is introduced to the gas generator with 4000 s.c.f. of oxygen and 200 lbs. of steam per barrel of hydrocarbon feed and is subjected to partial combustion at a temperature of 2500° F. and a pressure of 340 p.s.i.g. The product gases are cooled, scrubbed to remove carbon, and are then mixed with steam to provide a 5 to 1 water to CO ratio. The mixture is passed over an iron oxide catalyst to effect the water gas shift reaction and the product gases are passed through an amine scrubber for the removal of $CO_2$. The resulting gas has a hydrogen concentration of 94.51 vol. percent. 7800 cu. ft. of this hydrogen-rich gas is turned to the hydroconversion unit per barrel of liquid hydrocarbon feed to the hydroconversion unit. The balance of the hydrogen-rich gas is combined with the normally gaseous fraction separated from the hydroconversion product to produce a combustible gas of high heating value.

*Example II*

This example illustrates the upgrading of a heavy viscous oil to an oil pumpable at ordinary temperatures and the simultaneous conversion of a portion of the feed to a motor fuel of high octane number.

The hydrocarbon liquid starting material in this example is a reduced crude derived from a 50–50 mixture of San Ardo and Arabian crudes and has the following characteristics:

Gravity, ° API _____ 14.3
Viscosity, SF at 122 _____ 550
Carbon residue, wt. percent _____ 10.43
ASTM distillation range, ° F.:
  IBP _____ 400
  10% _____ 584
  20% _____ 609

This material, which is non-flowable at ordinary temperatures, is preheated and introduced into a tubular reactor maintained at the following operating conditions:

Average temperature _____ ° F__ 927
Average pressure _____ p.s.i.g__ 5251
Turbulence level _____ 116
Gas rates:
  Makeup hydrogen _____ s.c.f./bbl__ 6060
  Product gas _____ s.c.f./bbl__ 3050
  Recycle gas _____ s.c.f./bbl__ 15880
Hydrogen concentrations:
  Makeup hydrogen _____ vol. percent__ 93.98
  Product gas _____ do____ 74.16
  Recycle gas _____ do____ 85.06

The liquid products, that is the butanes and higher hydrocarbons, recovered from the reaction product amount to 112.7 volume percent basis feed, and have an API gravity of 32.9. This material is easily pumpable at normal temperatures.

For each barrel of feed to the hydroconversion unit 0.40 barrel of liquid hydroconversion product is fed to the gas generator. Oxygen and steam are also fed to the gas generator at the rate of 3690 s.c.f. oxygen and 140 lbs. of steam per bbl. of feed to the generator which is maintained at a temperature of 2500° F. and a pressure of 350 p.s.i.g. The partial combustion products are quenched, shifted and scrubbed as in Example I to produce a gas having a hydrogen concentration of 93.98 volume percent in an amount sufficient to supply 6060 cubic feet of makeup hydrogen used for each barrel of feed to the hydroconversion unit.

Fractionation of the hydroconversion liquid product gives a $C_5$–400° F. fraction having ASTM research octane numbers of 73.7 clear and 88.1 leaded (containing 3 ml. TEL per gallon) obtained in a yield of 42.67 volume percent basis feed to the hydroconversion unit.

It is also possible to provide the hydrogen by partial combustion of a portion of the heavy viscous starting material or by partial combustion of the light hydrocarbon product gases.

Obviously many modifications and variations of the invention, as hereinbefore set forth, may be made without departing from the spirit and scope thereof, and therefore, only such limitations should be imposed as are indicated in the appended claims.

We claim:

1. A process for the apolymeric hydroconversion of a hydrocarbon liquid starting material to an upgraded hydrocarbon liquid product which comprises passing a mixture of said hydrocarbon liquid starting material and hydrogen through a tubular reaction zone maintained at a temperature between about 800 and 1500° F., a pressure between about 500 and 20,000 p.s.i.g. and at a turbulence level as expressed by the ratio $\overline{\epsilon}_m/\nu$ of at least 25, recovering an upgraded liquid product from the reaction product, subjecting at least a portion of the balance of the reaction product to partial combustion with a free oxygen-containing gas to produce a synthesis gas containing hydrogen and carbon monoxide, contacting said synthesis gas with steam at a temperature between about 680 and 850° F. in the presence of a shift conversion catalyst in a water gas shift reaction, recovering a gas rich in hydrogen from the water gas shift reaction product and using at least a portion of the gas rich in hydrogen to form additional intimate mixture of hydrocarbon liquid starting material and hydrogen, said hydroconversion being accompanied by the consumption of hydrogen.

2. A process for the apolymeric hydroconversion of a hydrocarbon liquid starting material to an upgraded hydrocarbon liquid product which comprises passing a mixture of said hydrocarbon liquid starting material and hydrogen through a tubular reaction zone maintained at a temperature between about 800 and 1500° F., a pressure between about 500 and 20,000 p.s.i.g. and at a turbulence level as expressed by the ratio $\overline{\epsilon}_m/\nu$ of at least 25, recovering an upgraded liquid product from the reaction product, subjecting at least a portion of the balance of the reaction product to partial combustion with a free oxygen-containing gas to produce a synthesis gas containing hydrogen and carbon monoxide, contacting said synthesis gas with steam at a temperature between about 680 and 850° F. in the presence of an iron oxide catalyst in a water gas shift reaction, recovering a gas rich in hydrogen from the water gas shift reaction product and using at least a portion of the gas rich in hydrogen to form additional intimate mixture of hydrocarbon liquid starting material and hydrogen, said hydroconversion being accompanied by the consumption of hydrogen.

References Cited in the file of this patent

UNITED STATES PATENTS

| | | |
|---|---|---|
| 1,888,998 | Mercier | Nov. 29, 1932 |
| 2,007,226 | Szayna | July 9, 1935 |
| 2,014,350 | Ayres | Sept. 10, 1935 |
| 2,207,494 | Viktora | July 9, 1940 |
| 2,381,522 | Stewart | Aug. 7, 1945 |
| 2,698,830 | Jenny | Jan. 4, 1955 |